United States Patent
Mizuno et al.

(10) Patent No.: US 11,569,725 B2
(45) Date of Patent: Jan. 31, 2023

(54) POWER TOOL WITH CLUTCH AND MAGNETIC TORQUE TRANSMISSION MECHANISM

(71) Applicant: Panasonic Intellectual Property Management Co., Ltd., Osaka (JP)

(72) Inventors: Mitsumasa Mizuno, Osaka (JP); Itaru Murui, Mie (JP); Satoshi Kajiyama, Osaka (JP); Hiroaki Murakami, Kyoto (JP); Akiko Honda, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 271 days.

(21) Appl. No.: 16/647,466

(22) PCT Filed: Jun. 15, 2018

(86) PCT No.: PCT/JP2018/022880
§ 371 (c)(1),
(2) Date: Mar. 13, 2020

(87) PCT Pub. No.: WO2019/064724
PCT Pub. Date: Apr. 4, 2019

(65) Prior Publication Data
US 2020/0280252 A1  Sep. 3, 2020

(30) Foreign Application Priority Data
Sep. 26, 2017 (JP) .............................. JP2017-185207

(51) Int. Cl.
*B25B 21/02* (2006.01)
*F16D 7/02* (2006.01)
(Continued)

(52) U.S. Cl.
CPC .......... *H02K 49/102* (2013.01); *B25B 21/02* (2013.01); *B25F 5/001* (2013.01); *F16D 7/02* (2013.01); *F16D 41/10* (2013.01)

(58) Field of Classification Search
CPC ............ B25B 21/02; B25F 5/001; F16D 7/02; F16D 41/10; H02K 49/102; H02K 49/104; H02K 49/106; H02K 49/108
(Continued)

(56) References Cited

U.S. PATENT DOCUMENTS 2,741,712 A * 4/1956 Lonnqvist .............. H02K 7/065
                                                       310/78
3,150,725 A * 9/1964 Hornschuch ............ B25B 21/02
                                                       464/29
7,216,723 B2 * 5/2007 Ohtsu .................... B25B 21/026
                                                       310/23
(Continued)

FOREIGN PATENT DOCUMENTS

CN        101870097 A     10/2010
JP        S56-024562 U    3/1981
(Continued)

OTHER PUBLICATIONS

Machine translation of JP-2016175144-A. (Year: 2016).*
(Continued)

*Primary Examiner* — Michael Andrews
(74) *Attorney, Agent, or Firm* — McDermott Will & Emery LLP (57) ABSTRACT

A torque transmission mechanism transmits a torque produced by a rotation of a driving shaft to an output shaft. A clutch mechanism is provided between a motor and the torque transmission mechanism. The torque transmission mechanism includes a magnet coupling including a driving magnet member coupled to the driving shaft side and a driven magnet member coupled to the output shaft side. The
(Continued)

driving magnet member and the driven magnet member are arranged such that magnetic surfaces on each of which S-pole magnets and N-pole magnets are alternately arranged face other. The clutch mechanism transmits the torque produced by the rotation of the driving shaft to the driving magnet member but does not transmit a torque the driving magnet member receives from the driven magnet member to the driving shaft.

7 Claims, 5 Drawing Sheets

(51) Int. Cl.
*H02K 49/10* (2006.01)
*B25F 5/00* (2006.01)
*F16D 41/10* (2006.01)

(58) Field of Classification Search
USPC .............................................. 310/80, 50, 78
See application file for complete search history.

(56) References Cited

U.S. PATENT DOCUMENTS

| 9,236,715 | B2 | 1/2016 | Sakakura et al. |
| 2015/0130345 | A1 | 5/2015 | Sakakura et al. |

FOREIGN PATENT DOCUMENTS

| JP | H05-082797 U | 11/1993 | |
| JP | H09-254046 A | 9/1997 | |
| JP | 2005-140145 A | 6/2005 | |
| JP | 2006-234034 A | 9/2006 | |
| JP | 2009-232616 A | 10/2009 | |
| JP | 4834188 B | 12/2011 | |
| JP | 2012-245463 A | 12/2012 | |
| JP | 2013-066946 A | 4/2013 | |
| JP | 2014-211191 A | 11/2014 | |
| JP | 2015-113944 A | 6/2015 | |
| JP | 2016175144 A * | 10/2016 | |
| JP | 2017-032007 A | 2/2017 | |
| WO | 98/23025 A1 | 5/1998 | |
| WO | WO-9823025 A1 * | 5/1998 | ........... F16H 49/005 |

OTHER PUBLICATIONS

Machine translation of WO-9823025-A1. (Year: 1998).*
International Search Report issued in corresponding International Patent Application No. PCT/JP2018/022880, dated Aug. 21, 2018, with English translation.
Extended European Search Report issued in corresponding European Patent Application No. 18860314.6, dated Nov. 3, 2020.

* cited by examiner

POWER TOOL WITH CLUTCH AND MAGNETIC TORQUE TRANSMISSION MECHANISM

CROSS-REFERENCE OF RELATED APPLICATIONS

This application is the U.S. National Phase under 35 U.S.C. § 371 of International Patent Application No. PCT/JP2018/022880, filed on Jun. 15, 2018, which in turn claims the benefit of Japanese Patent Application No. 2017-185207, filed on Sep. 26, 2017, the entire disclosures of which Applications are incorporated by reference herein.

TECHNICAL FIELD

The present disclosure relates to an electric power tool adapted to transmit a torque produced by the rotation of a driving shaft to an output shaft so as to rotate a front-end tool.

BACKGROUND ART

Patent document 1 document discloses a fastening tool including a torque clutch mechanism configured such that a planetary gear deceleration mechanism is coupled to the rotary shaft of a motor and adapted to interrupt power transmission to the output shaft by idling a ring gear in the planetary gear mechanism in response to an increase of load torque. Further, patent document 2 discloses a rotary impact tool in which a hammer is attached to the driving shaft via a cam mechanism and the hammer applies a striking impact in the rotational direction to the anvil to rotate the output shaft when a load of a predetermined value or greater is exerted on the output shaft.

PATENT LITERATURES

[Patent Literature 1] JP2015-113944
[Patent Literature 2] JP2005-118910

SUMMARY OF INVENTION

Technical Problem

A related-art electric power tool employs a structure for transmitting a rotation torque of a motor to the output shaft mechanically and so produces noise when used. In particular, a mechanical rotary impact tool produces an impact torque when the hammer strikes the anvil and so produces a large impact noise. Therefore, development of an electric power tool that is excellent in quietness, with the impact torque being maintained, is called for.

The present disclosure addresses the issue discussed above and a purpose thereof is to provide an electric power tool that is excellent in quietness, with the impact torque being maintained.

Solution to Problem

The electric power tool according to an embodiment of the present disclosure includes: a driving shaft that is driven into rotation by a motor; an output shaft on which a front-end tool is attachable; a torque transmission mechanism that transmits a torque produced by a rotation of the driving shaft to the output shaft; and a clutch mechanism provided between the motor and the torque transmission mechanism. The torque transmission mechanism includes a magnet coupling including a driving magnet member coupled to the driving shaft side and a driven magnet member coupled to the output shaft side.

DESCRIPTION OF EMBODIMENTS

Figure 1:
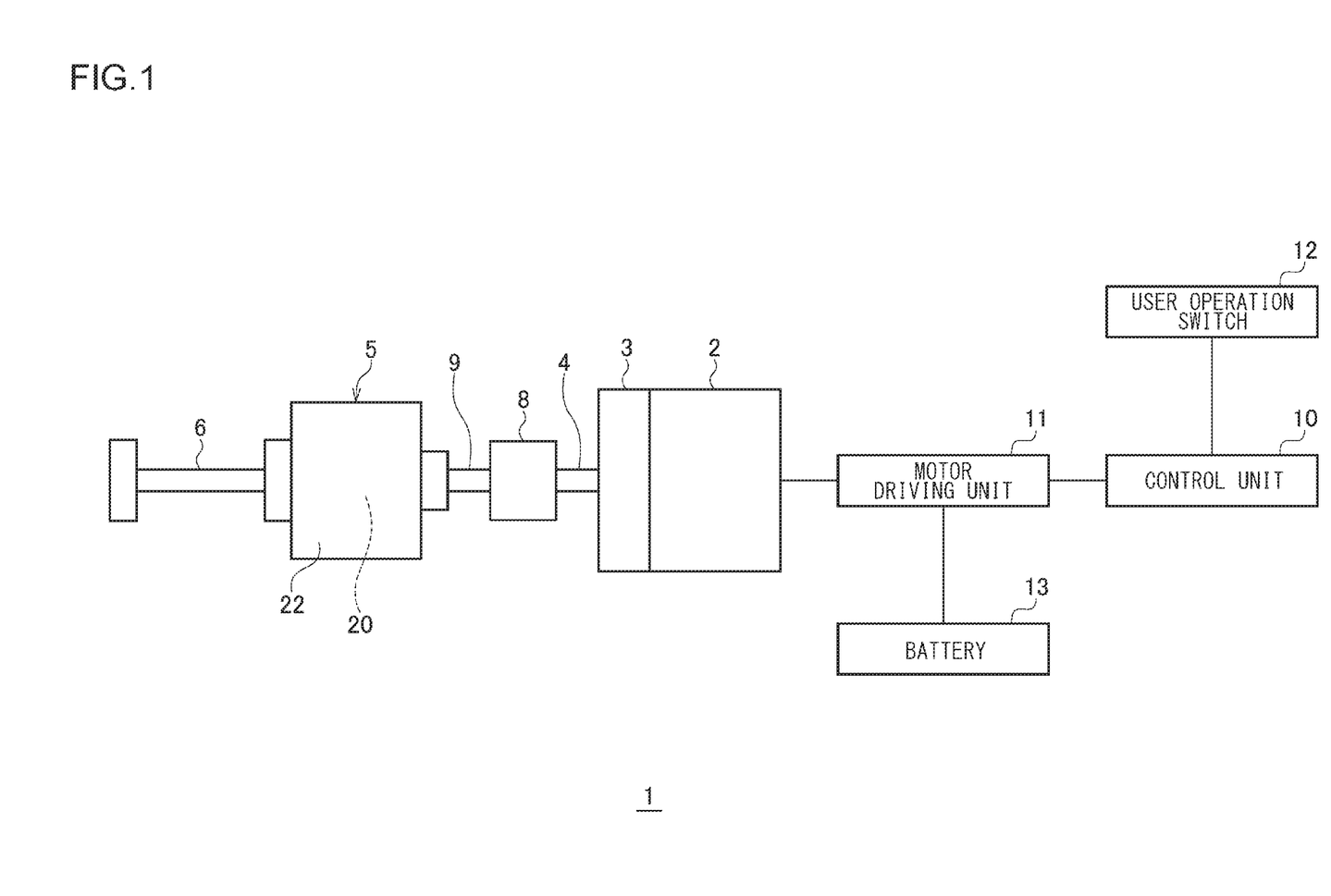
FIG. 1 shows an exemplary configuration of an electric power tool according to an embodiment.

FIG. 1 shows an exemplary configuration of an electric power tool 1 according to an embodiment of the present disclosure. The electric power tool 1 is a rotary tool in which a motor 2 is a driving source and includes a driving shaft 4 driven into rotation by the motor 2, an output shaft 6 on which a front-end tool can be attached, a torque transmission mechanism 5 for transmitting the torque produced by the rotation of the driving shaft 4 to the output shaft 6, and a clutch mechanism 8 provided between the motor 2 and the torque transmission mechanism 5. The clutch mechanism 8 may be configured as a mechanical element that transmits the torque produced by the rotation of the driving shaft 4 to the torque transmission mechanism 5 via a coupling shaft 9 but does not transmit the torque the coupling shaft 9 receives from the torque transmission mechanism 5 to the driving shaft 4. The function of the clutch mechanism 8 will be described in detail later.

In the electric power tool 1, power is supplied by a battery 13 built in a battery pack. The motor 2 is driven by a motor driving unit 11, and the rotation of the rotary shaft of the motor 2 is decelerated by a decelerator 3 and transmitted to the driving shaft 4. The clutch mechanism 8 transmits the rotation torque of the driving shaft 4 to the torque transmission mechanism 5 via the coupling shaft 9.

Figure 2:
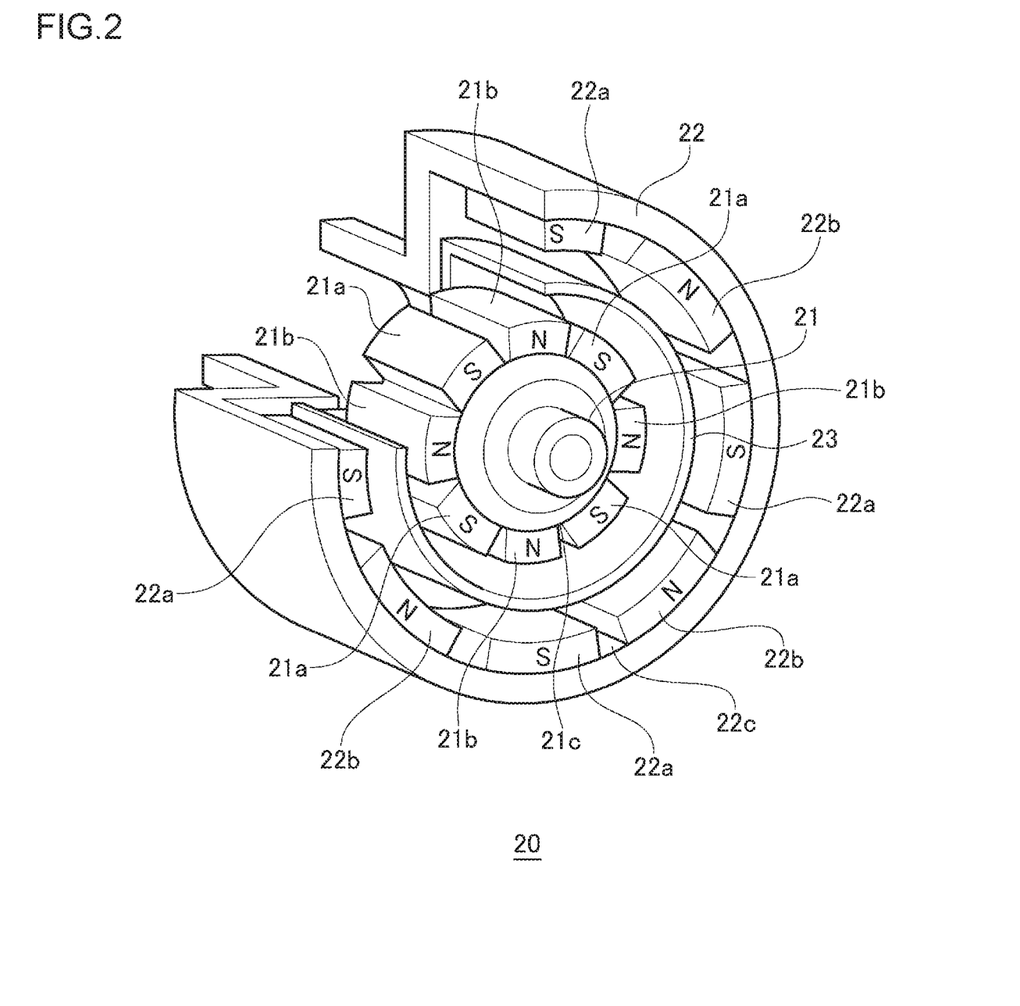
FIG. 2 shows an exemplary internal structure of the magnet coupling.

The torque transmission mechanism 5 according to the embodiment includes a magnet coupling 20 that enables contactless torque transmission. FIG. 2 shows an exemplary internal structure of the magnet coupling 20. FIG. 2 shows a perspective cross section in which a part of the cylinder-type magnet coupling 20 having an inner rotor and an outer rotor is cut out. S-poles and N-poles are alternately arranged adjacent to each other in the circumferential direction on the outer circumferential surface of the inner rotor cylinder and on the inner circumferential surface of the outer rotor cylinder. The magnet coupling 20 realizes superbly quiet torque transmission by magnetically transmitting the torque produced by the rotation of the driving shaft 4 to the output shaft 6. FIG. 2 shows the magnet coupling 20 of an eight-pole type, but the number of poles is not limited to eight.

The magnet coupling 20 includes a driving magnet member 21 coupled to the driving shaft 4 side, a driven magnet member 22 coupled to the output shaft 6 side, and a partition wall 23 provided between the driving magnet member 21 and the driven magnet member 22. In the magnet coupling 20 according to the embodiment, the driving magnet member 21 is an inner rotor, and the driven magnet member 22 is an outer rotor. Alternatively, the driving magnet member 21 may be an outer rotor, and the driven magnet member 22 may be an inner rotor.

The outer circumferential surface of the driving magnet member 21 that embodies the inner rotor forms a magnetic surface 21c on which S-pole magnets 21a and N-pole magnets 21b are alternately arranged. The inner circumferential surface of the driven magnet member 22 that embodies the outer rotor forms a magnetic surface 22c on which S-pole magnets 22a and N-pole magnets 22b are alternately arranged. The angular pitches of magnetic pole arrangement are configured to be equal in the magnetic surface 21c and the magnetic surface 22c.

The driving magnet member 21 and the driven magnet member 22 are arranged coaxially such that the magnetic surface 21c and the magnetic surface 22c face each other. The attraction exerted between the S-pole magnet 21a and the N-pole magnet 22b and between the N-pole magnet 21b and the S-pole magnet 22a in the direction in which the magnets face defines the relative positional relationship of the driving magnet member 21 and the driven magnet member 22.

The control unit 10 has the function of controlling the rotation of the motor 2. A user operation switch 12 is a trigger switch manipulated by a user. The control unit 10 turns the motor 2 on or off according to the manipulation of the user operation switch 12 and supplies the motor driving unit 11 with an instruction for driving determined by a manipulation variable of the user operation switch 12. The motor driving unit 11 controls the voltage applied to the motor 2 according to the instruction for driving supplied from the control unit 10 to adjust the number of revolutions of the motor.

By employing the magnet coupling 20, the electric power tool 1 is capable of transmitting a torque in a contactless manner and improving quietness of the tool. By alternately arranging S-poles and N-poles adjacent to each other on the magnetic surface 21c and alternately arranging S-poles and N-poles adjacent to each other on the magnetic surface 22c, the magnet coupling 20 is capable of transmitting a larger torque as compared with a case of providing the S-poles and the N-poles at a distance.

A description will now be given of a case of configuring the electric power tool 1 as a rotary impact tool. The rotary impact tool has the function of applying a striking impact intermittently to the output shaft 6 in the rotational direction. This is met in the embodiment by allowing the magnet coupling 20 that forms the torque transmission mechanism 5 to have the function of applying an intermittent rotary impact force to the output shaft 6. The magnet coupling 20 applies an intermittent rotary impact force to the output shaft 6 by changing the magnetic force exerted between the magnetic surface 21c of the driving magnet member 21 and the magnetic surface 22c of the driven magnet member 22.

Unless a load torque equal to or beyond the maximum torque that can be transmitted is exerted, the driving magnet member 21 and the driven magnet member 22 of the magnet coupling 20 are rotated in synchronization, substantially maintaining the relative positions in the rotational direction. As the tightening of the screw member progresses and a load torque beyond the maximum torque that can be transmitted by the magnet coupling 20 is exerted on the output shaft 6, however, the driven magnet member 22 will be unable to follow the driving magnet member 21. The state in which the driving magnet member 21 and the driven magnet member 22 are not synchronized will be referred to as "loss of synchronization". The magnet coupling 20 according to the embodiment applies an intermittent rotary striking force to the output shaft 6 by losing synchronization.

Figure 3:
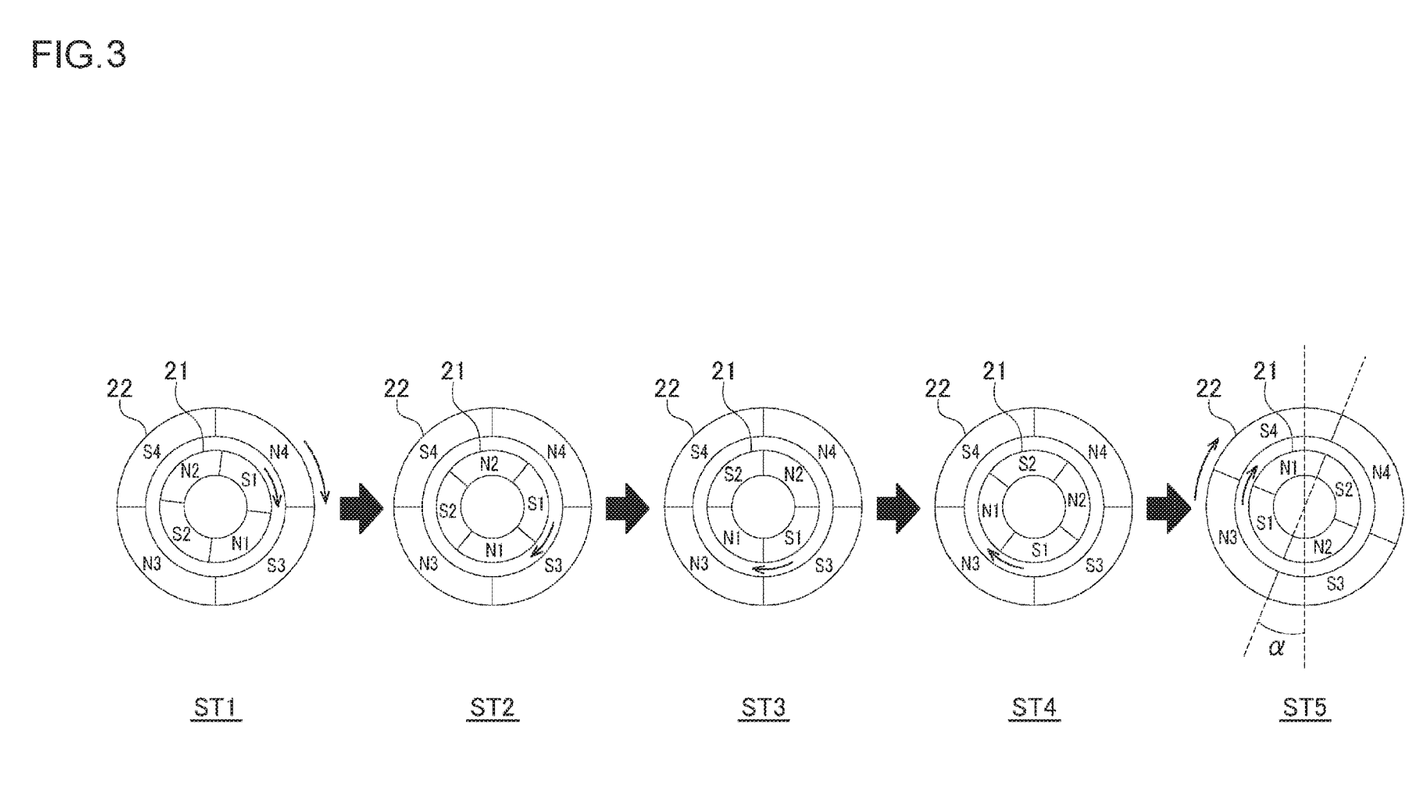
FIG. 3 shows a state transition of the magnet coupling.

FIG. 3 shows a state transition of the magnet coupling 20. FIG. 3 shows relative positional relationships of the driving magnet member 21 and the driven magnet member 22 in the rotational direction in a 4-pole type magnet coupling 20. Magnets S1, S2 and magnets N1 and N2 are the S-pole magnet 21a and the N-pole magnet 21b in the driving magnet member 21, respectively, and magnets S3, S4 and magnets N3, N4 are the S-pole magnet 22a and the N-pole magnet 22b in the driven magnet member 22, respectively.

The state ST1 is defined as a state in which the driving magnet member 21 is driven into rotation by the motor 2, and the driving magnet member 21 and the driven magnet member 22 are rotated in tandem, maintaining the relative synchronous positions. During the synchronous rotation, the driven magnet member 22 is rotated by following the rotation of the driving magnet member 21 so that the driven magnet member 22 is slightly behind the driving magnet member 21 in phase.

The state ST2 is defined as a state that occurs immediately before the driven magnet member 22 cannot follow the driving magnet member 21. When a load torque beyond the maximum torque that can be transmitted by the magnet coupling 20 is exerted on the output shaft 6 while the screw member is being tightened, the rotation of the driven magnet member 22 coupled to the output shaft 6 is stopped, and the driving magnet member 21 starts idling relative to the driven magnet member 22.

The state ST3 occurs while synchronization is being lost and is defined as a state in which the repulsive magnetic force exerted between the driving magnet member 21 and the driven magnet member 22 reaches the maximum level. Between the state ST2 and the state ST3, the driving magnet member 21 is rotated by the driving shaft 4. The state ST4 occurs while synchronization is being lost and is defined as a state in which the magnetic attraction rotates the driving magnet member 21 at a speed higher than the speed at which the motor 2 rotates the driving shaft 4.

To focus on the magnet S1 for the illustrative purpose, the maximum repulsive magnetic force is exerted between the magnet S1 and the magnet S3 in the state ST3. As the driving magnet member 21 is rotated further beyond the state ST3, the magnet S1 is driven by the repulsive magnetic force of the magnet S3 in the rotational direction away from the magnet S3 and is attracted by the attractive magnetic force of the magnet N3 toward the magnet N3 in the rotational direction. Like the magnet S1, the other magnets S2, N1, and N2 in the driving magnet member 21 receive a magnetic force from the driven magnet member 22 similarly. In the state ST4, therefore, the driving magnet member 21 is rotated relative to the driven magnet member 22 at a speed higher than the speed at which the motor 2 rotates the driving shaft 4.

The state ST5 is defined as a state when the driving magnet member 21 is rotated as far as the synchronous position of the driven magnet member 22 and applies a rotary impact force to the driven magnet member 22. When the driving magnet member 21 is rotated relative to the driven magnet member 22 as far as the position where the magnet S1 and the magnet N3, the magnet N1 and the magnet S4, and the magnet S2 and the magnet N4, and the magnet N2 and the magnet S3 face each other, respectively, the rotation of the driving magnet member 21 is damped abruptly (i.e., abruptly decelerated). The position is where the attractive magnetic force between the driving magnet member 21 and the driven magnet member 22 is at the maximum level, and where the driving magnet member 21 and the driven magnet member 22 are in synchronization.

In the state ST5, the driven magnet member 22 receives inertia induced by the abrupt deceleration of the driving magnet member 21. The inertial torque will produce a rotary impact force that rotates the driven magnet member 22, which had stopped its rotation, by an angle α. The relative positional relationship of the S-poles and the N-poles in the state ST5 is substantially identical to the relative positional relationship of the S-poles and the N-poles in the state ST1. The magnet coupling 20 applies an intermittent rotary impact force to the output shaft 6 by repeating the state transition from the state ST2 to the state ST5.

As described above, the torque transmission mechanism 5 according to the embodiment generates an intermittent rotary striking force by using loss of synchronization in the magnet coupling 20. As described above, the driving magnet member 21 is rotated relative to the driven magnet member 22 at a speed higher than the speed at which the motor 2 rotates the driving shaft 4 in the state ST4. If the driving magnet member 21 and the driving shaft 4 are coupled without any freedom, therefore, the driving shaft 4 and the driving magnet member 21 will be rotated as one piece, causing the motor 2 to function as a generator and damp the rotation of the driving magnet member 21 as a result, i.e., to function as a brake that slows the rotation speed.

This is addressed in the embodiment by providing the clutch mechanism 8 between the motor 2 and the torque transmission mechanism 5 to interrupt torque transmission between the driving shaft 4 and the driving magnet member 21 when the driving magnet member 21 is rotated at a speed higher than the speed of rotation by the motor 2 in the state ST4.

The clutch mechanism 8 according to the embodiment transmits the torque produced by the rotation of the driving shaft 4 to the driving magnet member 21 via the coupling shaft 9 but does not transmit the torque the driving magnet member 21 receives from the driven magnet member 22, i.e., the rotation torque produced by the attractive magnetic force in the direction of advancement, to the driving shaft 4. The clutch mechanism 8 may be a mechanical element that transmits a torque applied to the input side to the output side but does not transmit a torque (reverse input torque) applied to the output side to the input side. The clutch mechanism 8 allows the driving magnet member 21 to be rotated at a speed higher than the speed at which the motor 2 rotates the driving shaft 4 and to apply a large rotary impact force to the driven magnet member 22 without receiving a damping torque produced by the motor 2.

The clutch mechanism 8 may include a one-way clutch. The one-way clutch is arranged between the motor 2 and the torque transmission mechanism 5 so as to interrupt torque transmission between the driving magnet member 21 and the driving shaft 4 when the driving magnet member 21 is rotated normally at a speed higher than the speed at which the motor 2 rotates the driving shaft 4 normally.

Figure 4A:
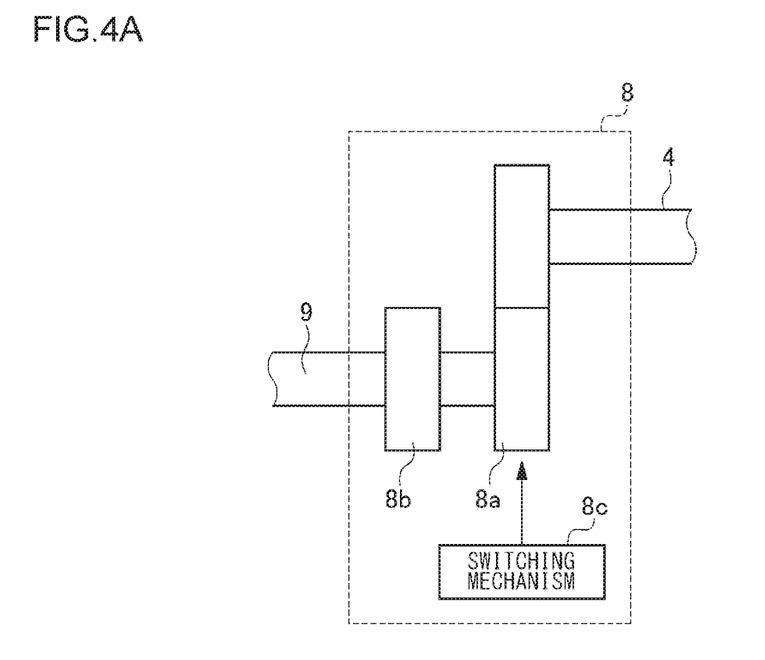
FIGS. 4A and 4B show an exemplary clutch mechanism comprised of a pair of one-way clutches.
Figure 4B:
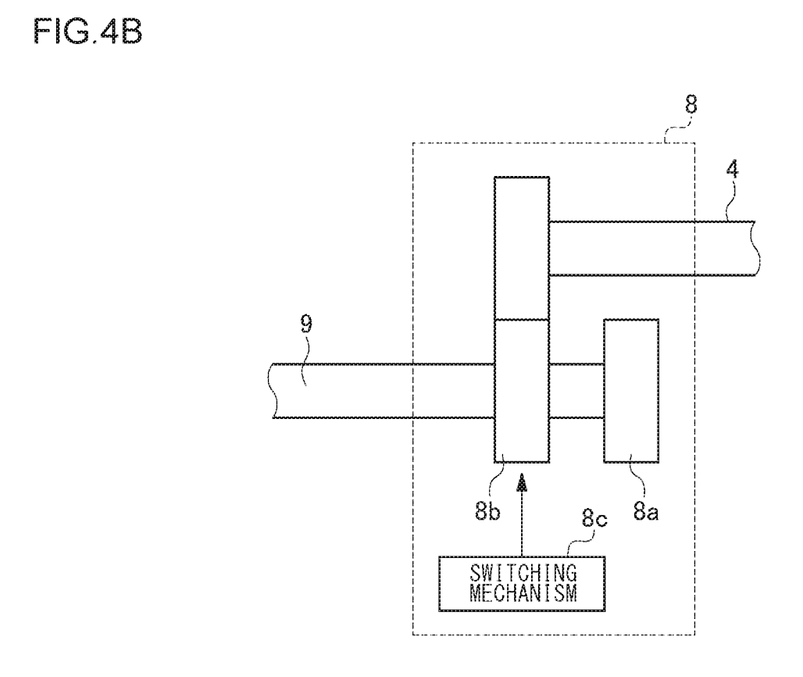

FIGS. 4A and 4B show an example of the clutch mechanism 8 comprised of a pair of one-way clutches adapted to transmit a torque in opposite directions. The clutch mechanism 8 includes a pair of first one-way clutch 8a and second one-way clutch 8b. For example, the first one-way clutch 8a transmits a torque in a direction of normal rotation of the motor 2, and the second one-way clutch 8b transmits a torque in a direction of reverse rotation of the motor 2. A switching mechanism 8c places one of the first one-way clutch 8a and the second one-way clutch 8b of the pair between the motor 2 and the torque transmission mechanism 5.

FIG. 4A shows a state in which the first one-way clutch 8a is coupled by the switching mechanism 8c to the driving shaft 4. The user attempting to tighten a screw member manipulates the switching mechanism 8c to couple the first one-way clutch 8a to the driving shaft 4. FIG. 4B shows a state in which the second one-way clutch 8b is coupled by the switching mechanism 8c to the driving shaft 4. The user attempting to loosen a screw member manipulates the switching mechanism 8c to couple the second one-way clutch 8b to the driving shaft 4.

By configuring the clutch mechanism 8 to include a pair of one-way clutches capable of transmitting a torque in opposite directions in such a manner that one of the clutches is switched into use, the user can use the electric power tool 1 both in a job of tightening a screw member and a job of loosening a screw member. The clutch mechanism 8 may be comprised of a two-way clutch capable of switching a direction of torque transmission.

The clutch mechanism 8 may be comprised of a reverse input cut-off clutch that does not transmit a torque that the driving magnet member 21 receives from the driven magnet member 22 to the driving shaft 4. The reverse input cut-off clutch is formed to transmit a torque applied to the input side to the output side but not to transmit a torque (reverse input torque) applied to the output side to the input side regardless of the direction of rotation. By configuring the clutch mechanism 8 to include a reverse input cut-off clutch, therefore, the electric power tool 1 can be used both in a job of tightening a screw member and a job of loosening a screw member without requiring the user to manipulate and switch the clutch.

Described above is an explanation based on an embodiment. The embodiment is intended to be illustrative only and it will be understood by those skilled in the art that various modifications to constituting elements and processes could be developed and that such modifications are also within the scope of the present disclosure.

In the embodiment, the magnet coupling 20 is described as being of a cylinder type having an inner rotor and an outer rotor. Alternatively, the magnet coupling 20 may be of a disk type having two disks with their magnetic surfaces thereof facing each other in the axial direction.

Figure 5A:
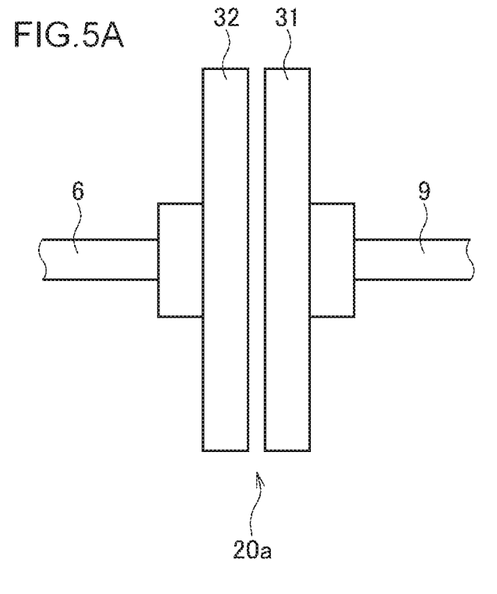
FIGS. 5A and 5B shows another exemplary magnet coupling.
Figure 5B:
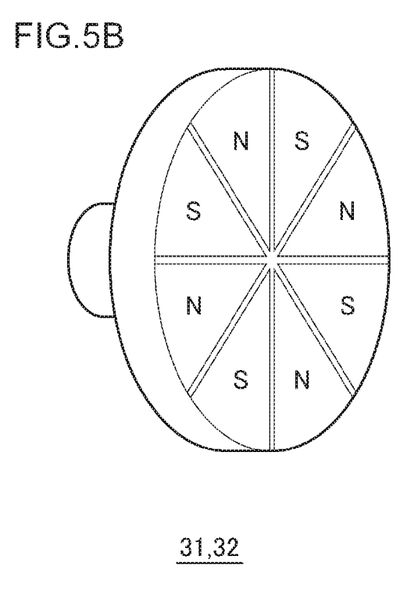

FIG. 5 shows another exemplary magnet coupling 20a. FIG. 5A shows a side surface of the magnet coupling 20a of a disk type having an input side disk and an output side disk. FIG. 5B shows a magnetic surface of the input side disk or the output side disk. Each of the disk surface of the input side disk and the disk surface of the output side disk is provided with S-poles and N-poles alternately arranged adjacent to each other in the circumferential direction. The magnet coupling 20a of a disk type equally realizes superbly quiet torque transmission by transmitting the torque produced by the rotation of the driving shaft 4 to the output shaft 6 by a magnetic force. FIG. 5B shows the magnet coupling 20a of an 8-pole type, but the number of poles is not limited to eight.

The magnet coupling 20a includes a driving magnet member 31 and a driven magnet member 22, the driving magnet member 31 being coupled to the coupling shaft 9 toward the driving shaft 4 side and the driven magnet member 32 being coupled to the output shaft 6 side. The disk surface of each of the driving magnet member 31 and the driven magnet member 32 forms a magnetic surface on which S-pole magnets and N-pole magnets are alternately arranged. In the magnet coupling 20a, the driving magnet member 31 and the driven magnet member 32 are arranged coaxially such that the respective magnetic surfaces face each other. The magnet coupling 20a of a disk type shown in FIG. 5A can equally apply an intermittent rotary impact force to the output shaft 6.

An embodiment of the present disclosure is summarized below. An electric power tool (1) according to an embodiment of the disclosure includes: a driving shaft (4) that is driven into rotation by a motor (2); an output shaft (6) on which a front-end tool is attachable; a torque transmission mechanism (5) that transmits a torque produced by a rotation of the driving shaft (4) to the output shaft (6); and a clutch mechanism (8) provided between the motor (2) and the torque transmission mechanism (5). The torque transmission mechanism (5) includes a magnet coupling (20) including a driving magnet member (21) coupled to the driving shaft side and a driven magnet member (22) coupled to the output shaft side.

The clutch mechanism (8) is configured to transmit the torque produced by the rotation of the driving shaft (4) to the driving magnet member (21) but does not transmit a torque the driving magnet member (21) receives from the driven magnet member (22) to the driving shaft (4).

The clutch mechanism (8) may include a one-way clutch. The clutch mechanism (8) is comprised of a pair of one-way clutches that transmit a torque in opposite directions, and the electric power tool (1) may further include a switching mechanism (8c) that places one of the pair of one-way clutches between the motor (2) and the torque transmission mechanism (5).

The clutch mechanism (8) may include a two-way clutch capable of switching a direction of torque transmission. The clutch mechanism (8) may include a reverse input cut-off clutch that does not transmit a torque that the driving magnet member (21) receives from the driven magnet member (22) to the driving shaft (4).

The driving magnet member (21) and the driven magnet member (22) may be arranged such that magnetic surfaces (21c) on each of which S-pole magnets and N-pole magnets are alternately arranged face other.

REFERENCE SIGNS LIST

1 . . . electric power tool, 2 . . . motor, 3 . . . decelerator, 4 . . . driving shaft, 5 . . . torque transmission mechanism, 6 . . . output shaft, 8 . . . clutch mechanism, 8a . . . first one-way clutch, 8b . . . second one-way clutch, 8c . . . switching mechanism, 9 . . . coupling shaft, 10 . . . control unit, 11 . . . motor driving unit, 12 . . . user operation switch, 13 . . . battery, 20, 20a . . . magnet coupling, 21 . . . driving magnet member, 21a . . . S-side magnet, 21b . . . N-side magnet, 21c . . . magnetic face, 22 . . . driven magnet member, 22a . . . S-side magnet, 22b . . . N-side magnet, 22c . . . magnetic surface, 23 . . . partition wall, 31 . . . driving magnet member, 32 . . . driven magnet member

INDUSTRIAL APPLICABILITY

The present disclosure can be used in electric power tools for rotating a font-end tool.

The invention claimed is:

1. A rotary impact tool comprising:
a driving shaft that is driven into rotation by a motor;
an output shaft on which a front-end tool is attachable;
a torque transmission mechanism that transmits a torque produced by a rotation of the driving shaft to the output shaft; and
a clutch mechanism provided between the motor and the torque transmission mechanism, wherein:
the torque transmission mechanism includes a magnet coupling including a driving magnet member coupled to the driving shaft side and a driven magnet member coupled to the output shaft side, and
the torque transmission mechanism and the clutch are configured such that, after the driving magnet member and the driven magnet member lose synchronization, the driving magnet member is rotated at a speed higher than a speed at which the motor rotates the driving shaft by the clutch mechanism interrupting torque transmission between the driving shaft and the driving magnet member, so that the torque transmission mechanism generates intermittent rotary striking force by using loss of synchronization in the magnet coupling.

2. The rotary impact tool according to claim 1, wherein the clutch mechanism transmits the torque produced by the rotation of the driving shaft to the driving magnet member but does not transmit a torque the driving magnet member receives from the driven magnet member to the driving shaft.

3. The rotary impact tool according to claim 1, wherein the clutch mechanism includes a one-way clutch.

4. The rotary impact according to claim 3, wherein the clutch mechanism includes a pair of one-way clutches that transmit a torque in opposite directions, and
the electric power tool further comprises a switching mechanism that places one of the pair of one-way clutches between the motor and the torque transmission mechanism.

5. The rotary impact tool according to claim 1, wherein the clutch mechanism includes a two-way clutch capable of switching a direction of torque transmission.

6. The rotary impact tool according to claim 1, wherein the clutch mechanism includes a reverse input cut-off clutch that does not transmit a torque that the driving magnet member receives from the driven magnet member to the driving shaft.

7. The rotary impact tool according to claim 1, wherein the driving magnet member and the driven magnet member are arranged such that magnetic surfaces on each of which S-pole magnets and N-pole magnets are alternately arranged face other.

* * * * *